(12) United States Patent
Ye

(10) Patent No.: US 12,066,989 B2
(45) Date of Patent: Aug. 20, 2024

(54) METHOD AND APPARATUS FOR CONSTRUCTING KNOWLEDGE GRAPH

(71) Applicant: Siemens Ltd., China, Beijing (CN)

(72) Inventor: Xian Yi Ye, Beijing (CN)

(73) Assignee: SIEMENS LTD., CHINA, Beijing (CN)

( * ) Notice: Subject to any disclaimer, the term of this patent is extended or adjusted under 35 U.S.C. 154(b) by 0 days.

(21) Appl. No.: 18/043,717

(22) PCT Filed: Sep. 10, 2020

(86) PCT No.: PCT/CN2020/114572
§ 371 (c)(1),
(2) Date: Mar. 1, 2023

(87) PCT Pub. No.: WO2022/051996
PCT Pub. Date: Mar. 17, 2022

(65) Prior Publication Data
US 2023/0350861 A1 Nov. 2, 2023

(51) Int. Cl.
*G06F 16/21* (2019.01)
*G06F 16/22* (2019.01)

(52) U.S. Cl.
CPC ........ *G06F 16/212* (2019.01); *G06F 16/2282* (2019.01)

(58) Field of Classification Search
CPC .... G06F 16/26; G06F 16/284; G06F 16/2456; G06F 16/2428
USPC ....................................................... 707/803
See application file for complete search history.

(56) References Cited

U.S. PATENT DOCUMENTS 8,417,715 B1 * 4/2013 Bruckhaus ............. G06Q 10/04
705/26.1
2020/0320100 A1 * 10/2020 Piecko .................... G06F 16/26

FOREIGN PATENT DOCUMENTS

| CN | 111 597 788 | 8/2000 | ........... G06F 40/189 |
| CN | 107 665 252 | 2/2018 | ............. G06F 17/30 |
| CN | 108 182 295 | 6/2018 | ............. G06F 17/30 |
| CN | 109 446 341 | 3/2019 | ............. G06F 16/36 |
| CN | 111 090 683 | 5/2020 | ......... G06F 16/2458 |
| CN | 111 324 609 | 6/2020 | ............. G06F 16/22 |

OTHER PUBLICATIONS

Search Report for International Application No. PCT/CN2020/114572, 14 pages, Jun. 9, 2021.

* cited by examiner

*Primary Examiner* — Hung T Vy
(74) *Attorney, Agent, or Firm* — Slayden Grubert Beard PLLC

(57) ABSTRACT

Various embodiments of the teachings herein include a method for constructing a knowledge graph. The method may include: acquiring training data; using the training data to train a classification model; for each column of data providing each attribute value into the classification model, to obtain an entity attribute, and determining an entity attribute; subjecting to determine a mapping relationship between the columns of data; determining a mapping relationship between the entity attributes; determining a mapping relationship between entities corresponding to the entity attributes; and generating a knowledge graph comprising the entities and the mapping relationship between the entities.

10 Claims, 8 Drawing Sheets

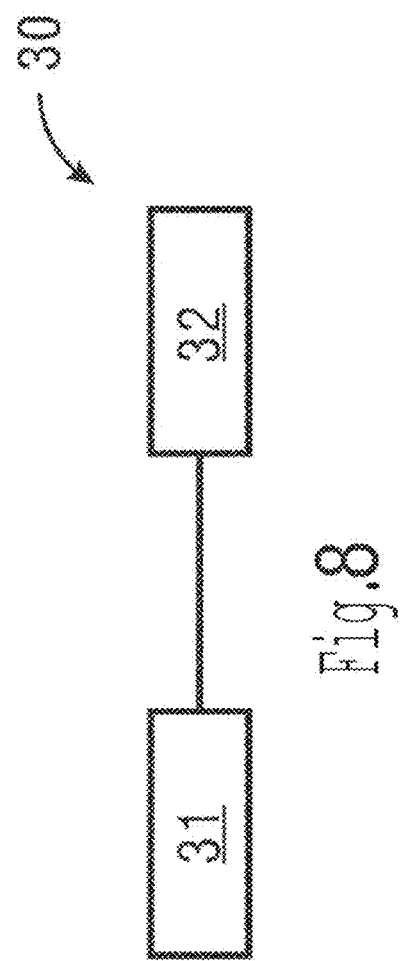

METHOD AND APPARATUS FOR CONSTRUCTING KNOWLEDGE GRAPH

CROSS-REFERENCE TO RELATED APPLICATIONS

This application is a U.S. National Stage Application of International Application No. PCT/CN2020/114572 filed Sep. 10, 2020, which designates the United States of America, the contents of which are hereby incorporated by reference in their entirety.

TECHNICAL FIELD

The present disclosure relates to data processing. Various embodiments may include methods and/or apparatus for constructing a knowledge graph.

BACKGROUND

A large industrial system generally consists of several sub-systems. Each sub-system might span different fields, and user data generated by each sub-system might have different data structures. When using each sub-system in the industrial system to develop an upper-layer application program, developers need to determine entities included in the industrial system and associative relationships between the entities according to the user data generated by each sub-system, and then determine the data structures of the user data according to the associative relationships between the entities, in order to develop the upper-layer application according to the data structures of the user data. Here, "entity" is an abstract definition, being a collective term for a class of things.

Since the table names and column names of the user data generated by the sub-systems are not standardized, developers will not be able to directly determine the entity and entity attributes described by each column of data in the user data according to the table names and column names of the user data, so the developers will need to combine personal experience with technical files of the corresponding sub-systems to guess the entity and entity attributes described by each column of data in the user data, in order to determine the associative relationships between the entities.

Developers' personal experience is limited, and there are cases where technical files are missing or do not match the sub-systems, so the method of relying on developers' personal experience and technical files to determine the associative relationships between the entities described by the user data has low efficiency.

SUMMARY

In view of the above, the method and apparatus for constructing a knowledge graph as described in the present disclosure enable developers to quickly determine associative relationships between entities described by user data according to the constructed knowledge graph. For example, some embodiments include a method for constructing a knowledge graph, comprising: acquiring training data relating to the same field as user data, wherein the user data is data to be subjected to data structure identification; using the training data to train a classification model, wherein the classification model is used to output, based on an inputted attribute value, an entity attribute to which the attribute value belongs; for each column of data in the user data, respectively inputting each attribute value included in the column of data into the classification model, to obtain an entity attribute to which each attribute value in the column of data belongs, and determining an entity attribute described by the column of data according to the entity attribute to which each attribute value in the column of data belongs; subjecting the user data to data structure identification, to determine a mapping relationship between the columns of data in the user data; determining a mapping relationship between the entity attributes described by the columns of data in the user data according to the entity attributes described by the columns of data in the user data and the mapping relationship between the columns of data in the user data; determining a mapping relationship between entities corresponding to the entity attributes described by the columns of data in the user data according to the mapping relationship between the entity attributes described by the columns of data in the user data and the entities corresponding to the entity attributes; and generating a knowledge graph comprising the entities and the mapping relationship between the entities.

In some embodiments, the step of using the training data to train a classification model comprises: extracting at least one corpus file from the training data, wherein each corpus file corresponds to one entity attribute, and each corpus file has stored therein at least one attribute value belonging to the entity attribute corresponding to the corpus file; generating a model training file according to each corpus file, wherein the correspondence between each attribute value stored in each corpus file and the entity attribute to which it belongs is recorded in the model training file; and using the model training file to train the classification model.

In some embodiments, the step of determining an entity attribute described by the column of data according to the entity attribute to which each attribute value in the column of data belongs, comprises: for each of the entity attributes to which the attribute values in the column of data belong, counting the number of attribute values belonging to this entity attribute among the attribute values included in the column of data; determining a target entity attribute, wherein the number of attribute values belonging to the target entity attribute is greatest among the attribute values included in the column of data; and determining the target entity attribute to be the entity attribute described by the column of data.

In some embodiments, after the step of determining an entity attribute described by the column of data according to the entity attribute to which each attribute value in the column of data belongs, the method further comprises: generating an entity mapping table according to the entity attribute described by each column of data in the user data and the entity corresponding to each entity attribute, wherein a mapping relationship linking an entity, an entity attribute, a data table name and a column name is recorded in the entity mapping table; the data table name is a table name of a data table included in the user data, the column name is a name of a corresponding column in the data table, a mapping between an entity and an entity attribute means that the entity attribute is used to describe the entity, and a mapping linking an entity attribute, a data table name and a column name means that a column of data whose name is this column name in the data table whose table name is this data table name in the user data is the attribute value of this entity attribute.

In some embodiments, after the step of determining a mapping relationship between the entity attributes described by the columns of data in the user data, the method further comprises: generating a relationship mapping table according to the entity attributes described by the columns of data in the user data and the mapping relationship between the entity attributes described by the columns of data in the user data, wherein the mapping relationship between the entity attributes, and a mapping relationship linking an entity attribute to a table name of a data table and a column name of a column containing the column data describing this entity attribute in the user data, are recorded in the relationship mapping table.

As another example, some embodiments include an apparatus for constructing a knowledge graph, comprising: a model training module, configured to acquire training data relating to the same field as user data, and use the training data to train a classification model, wherein the user data is data to be subjected to data structure identification, and the classification model is used to output, based on an inputted attribute value, an entity attribute to which the attribute value belongs; an attribute classification module, configured to, for each column of data in the user data, respectively input each attribute value included in the column of data into the classification model trained by the model training module, to obtain an entity attribute to which each attribute value in the column of data belongs, and determine an entity attribute described by the column of data according to the entity attribute to which each attribute value in the column of data belongs; a structure analysis module, configured to subject the user data to data structure identification, to determine a mapping relationship between the columns of data in the user data; a relationship mapping module, configured to determine a mapping relationship between the entity attributes described by the columns of data in the user data according to the entity attributes described by the columns of data in the user data as determined by the attribute classification module and the mapping relationship between the columns of data in the user data as determined by the structure analysis module, and determine a mapping relationship between entities corresponding to the entity attributes described by the columns of data in the user data according to the mapping relationship between the entity attributes described by the columns of data in the user data and the entities corresponding to the entity attributes; a graph construction module, configured to generate a knowledge graph comprising the entities and the mapping relationship between the entities according to the mapping relationship between the entities as determined by the relationship mapping module.

In some embodiments, the model training module comprises: an extraction sub-module, configured to extract at least one corpus file from the training data, wherein each corpus file corresponds to one entity attribute, and each corpus file has stored therein at least one attribute value belonging to the entity attribute corresponding to the corpus file; an integration sub-module, configured to generate a model training file according to each corpus file extracted by the extraction sub-module, wherein the correspondence between each attribute value stored in each corpus file and the entity attribute to which it belongs is recorded in the model training file; and a training sub-module, configured to use the model training file generated by the integration sub-module to train the classification model.

In some embodiments, the attribute classification module comprises: a counting sub-module, configured to, for each of the entity attributes to which the attribute values in one column of data belong, count the number of attribute values belonging to this entity attribute among the attribute values included in the column of data; a screening sub-module, configured to determine a target entity attribute according to a counting result of the counting sub-module, wherein the number of attribute values belonging to the target entity attribute is greatest among the attribute values included in one column of data; and an output sub-module, configured to determine the target entity attribute screened out by the screening sub-module to be the entity attribute described by the corresponding column data.

In some embodiments, the apparatus for constructing a knowledge graph further comprises: a first table generating module, configured to generate an entity mapping table according to the entity corresponding to each entity attribute and the entity attribute described by each column of data in the user data as determined by the attribute classification module, wherein a mapping relationship linking an entity, an entity attribute, a data table name and a column name is recorded in the entity mapping table; the data table name is a table name of a data table included in the user data, the column name is a name of a corresponding column in the data table, a mapping between an entity and an entity attribute means that the entity attribute is used to describe the entity, and a mapping linking an entity attribute, a data table name and a column name means that a column of data whose name is this column name in the data table whose table name is this data table name in the user data is the attribute value of this entity attribute.

In some embodiments, the apparatus for constructing a knowledge graph further comprises: a second table generating module, configured to generate a relationship mapping table according to the entity attributes described by the columns of data in the user data as determined by the attribute classification module and the mapping relationship between the entity attributes described by the columns of data in the user data as determined by the relationship mapping module, wherein the mapping relationship between the entity attributes, and a mapping relationship linking an entity attribute to a table name of a data table and a column name of a column containing the column data describing this entity attribute in the user data, are recorded in the relationship mapping table.

As another example, some embodiments include an apparatus for constructing a knowledge graph, comprising: at least one memory and at least one processor; the at least one memory is used to store a machine-readable program; the at least one processor is used to call the machine-readable program, to perform one or more of the methods as described herein.

As another example, some embodiments include a computer-readable medium, having stored thereon computer instructions which, when executed by a processor, cause the processor to perform one or more of the methods as described herein.

As another example, a computer program, comprising computer-executable instructions which, when executed, cause at least one processor to perform one or more of the methods as described herein.

As another example, some embodiments include a computer program product, tangibly stored on a computer-readable medium and comprising computer-executable instructions which, when executed, cause at least one processor to perform one or more of the methods as described herein.

BRIEF DESCRIPTION OF THE DRAWINGS

FIG. 8 is a schematic diagram of another apparatus for constructing a knowledge graph incorporating teachings of the present disclosure.

KEY TO THE DRAWINGS

Figure 1:
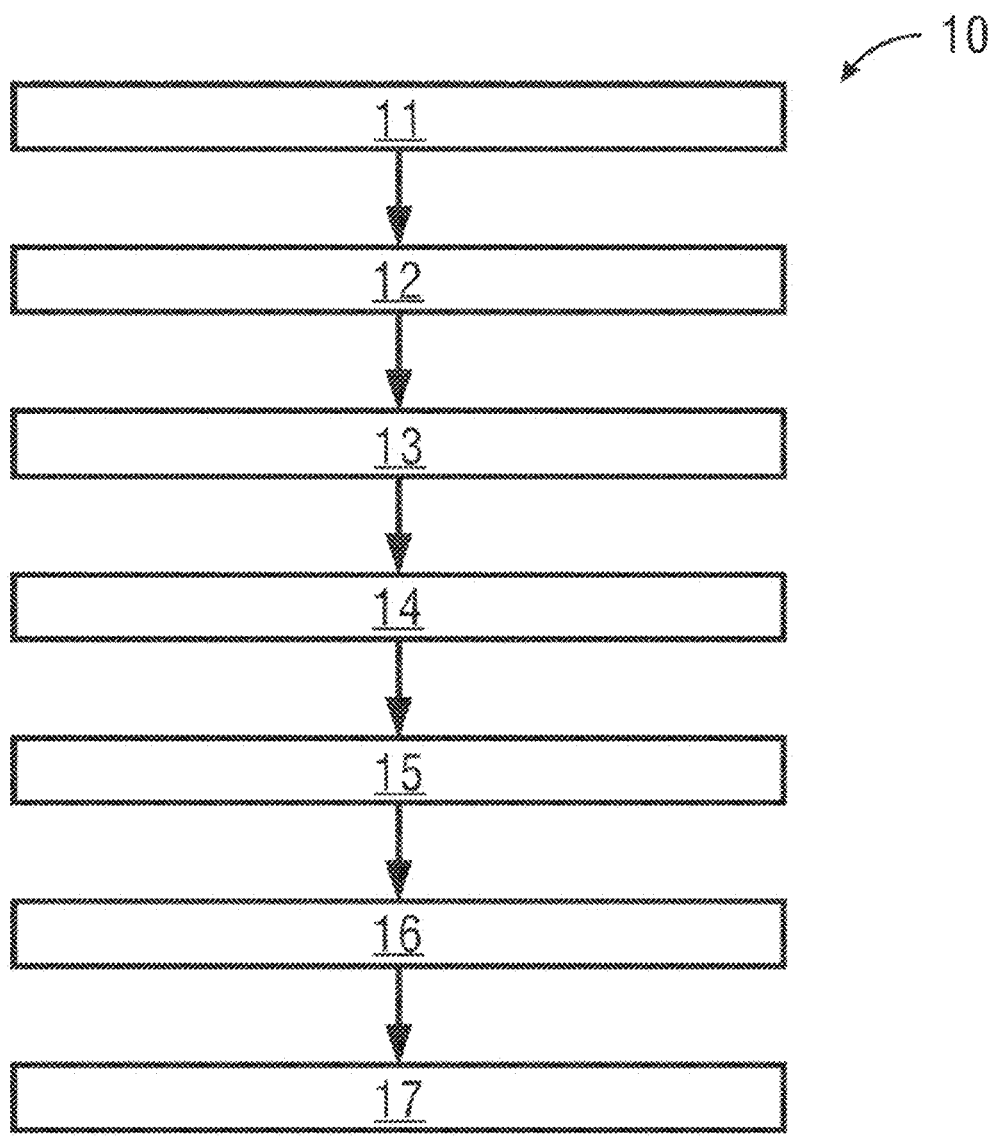
FIG. 1 is a flow chart of a method for constructing a knowledge graph incorporating teachings of the present disclosure.

10: method for constructing knowledge graph
20: apparatus for constructing knowledge graph
30: apparatus for constructing knowledge graph
121: training data
122: corpus file
123: model training file
124: classification model
1211: field data
21: model training module
22: attribute classification module
23: structure analysis module
24: relationship mapping module
25: graph construction module
26: first table generating module
27: second table generating module
211: extraction sub-module
212: integration sub-module
213: training sub-module
221: counting sub-module
222: screening sub-module
223: output sub-module
31: memory
32: processor
11: acquire training data relating to same field as user data;
12: use training data to train classification model;
13: separately determine entity attribute described by each column of data in user data;
14: subject user data to data structure identification, to determine mapping relationship between columns of data in user data;
15: determine mapping relationship between entity attributes according to mapping relationship between columns of data and entity attributes described;
16: determine mapping relationship between entities corresponding to entity attributes described by columns of data;
17: generate knowledge graph comprising entities and mapping relationship between entities.

DETAILED DESCRIPTION

It can be seen from the technical solution described above that training data relating to the same field as user data is acquired to train a classification model, such that the trained classification model can output an entity attribute to which an inputted attribute value belongs; after separately inputting each column of data in the user data into the classification model, an entity attribute described by each column of data in the user data can be determined; by subjecting the user data to structure identification, a mapping relationship between the columns of data in the user data can be determined; then a mapping relationship between the entity attributes described by the columns of data in the user data can be determined according to the entity attributes described by the columns of data in the user data and the mapping relationship between the columns of data in the user data; then a mapping relationship between entities described by the user data can be determined according to the mapping relationship between the entity attributes and correspondences between the entity attributes and the entities; then a knowledge graph can be generated according to the mapping relationship between the entities. Since the knowledge graph can show associative relationships between entities in a visually direct way, in order to determine the associative relationships between the entities described by the user data, the corresponding knowledge graph is generated automatically according to the user data, and a developer can quickly determine the associative relationships between the entities described by the user data according to the generated knowledge graph; in this way, the efficiency with which the developer determines the user data structure can be increased.

As stated above, when subjecting an industrial system comprising multiple sub-systems to system integration, it is necessary to develop an upper-layer application based on user data generated by the multiple sub-systems; to do this, it is first necessary to determine the entities described by the user data and the associative relationships between the entities. At present, when determining the associative relationships between the entities described by the user data, since the table names and column names of the user data generated by the sub-systems are not standardized, developers will not be able to directly determine the associative relationships between the entities described by the user data according to the table names and column names, so the developers will need to combine personal experience with technical files of the sub-systems to determine the associative relationships between the entities described by the user data. However, developers' personal experience is limited, and the technical files of some sub-systems do not match the sub-systems, so the method of relying on developers' personal experience and technical files to determine the associative relationships between the entities described by the user data has low efficiency.

In some embodiments, after each column of data in the user data is inputted into a classification model, entity attributes described by each column of data in the user data can be determined, a mapping relationship between the columns of data in the user data can be determined by subjecting the user data to structure identification, then a mapping relationship between the entity attributes described by the columns of data in the user data can be determined according to the entity attributes described by the columns of data in the user data and the mapping relationship between the columns of data, then a mapping relationship between the entities described by the user data can be determined according to the mapping relationship between the entity attributes described by the columns of data in the user data and the entities corresponding to the entity attributes, then a knowledge graph can be generated according to the mapping relationship between the entities described by the user data. Since the knowledge graph can show the associative relationships between the entities in a visually direct way, after constructing the knowledge graph according to the user data, developers can quickly determine the associative relationships between the entities described by the user data according to the constructed knowledge graph.

As shown in FIG. 1, the teachings of the present disclosure provide a method 10 for constructing a knowledge graph, and the method may comprise the following steps:

step 11: acquiring training data relating to the same field as user data, wherein the user data is data to be subjected to data structure identification;

step 12: using the training data to train a classification model, wherein the classification model is used to output, based on an inputted attribute value, an entity attribute to which the attribute value belongs;

step 13: for each column of data in the user data, respectively inputting each attribute value included in the column of data into the classification model, to obtain an entity attribute to which each attribute value in the column of data belongs, and determining an entity attribute described by the column of data according to the entity attribute to which each attribute value in the column of data belongs;

step 14: subjecting the user data to data structure identification, to determine a mapping relationship between the columns of data in the user data;

step 15: determining a mapping relationship between the entity attributes described by the columns of data in the user data according to the entity attributes described by the columns of data in the user data and the mapping relationship between the columns of data in the user data;

step 16: determining a mapping relationship between entities corresponding to the entity attributes described by the columns of data in the user data according to the mapping relationship between the entity attributes described by the columns of data in the user data and the entities corresponding to the entity attributes; and step 17: generating a knowledge graph comprising the entities and the mapping relationship between the entities.

In some embodiments, training data relating to the same field as user data is acquired to train a classification model, such that the trained classification model can output an entity attribute to which an inputted attribute value belongs; after separately inputting each column of data in the user data into the classification model, an entity attribute described by each column of data in the user data can be determined; by subjecting the user data to structure identification, a mapping relationship between the columns of data in the user data can be determined; then a mapping relationship between the entity attributes described by the columns of data in the user data can be determined according to the entity attributes described by the columns of data in the user data and the mapping relationship between the columns of data in the user data; then a mapping relationship between entities described by the user data can be determined according to the mapping relationship between the entity attributes and correspondences between the entity attributes and the entities; then a knowledge graph can be generated according to the mapping relationship between the entities. Since the knowledge graph can show associative relationships between entities in a visually direct way, in order to determine the associative relationships between the entities described by the user data, the corresponding knowledge graph is generated automatically according to the user data, and a developer can quickly determine the associative relationships between the entities described by the user data according to the generated knowledge graph; in this way, the efficiency with which the developer determines the user data structure can be increased.

In some embodiments, in step 11 of acquiring training data for training the classification model, since the trained classification model is used to predict the entity attributes to which the attribute values in the user data belong, in order to ensure that the classification model is able to predict the entity attributes to which the attribute values in the user data belong and ensure the accuracy of the prediction result, the acquired training data should relate to the same technical field as the user data. Furthermore, since the sub-systems included in the same industrial system might relate to different fields of business, while the same sub-system might also relate to multiple fields of business, the user data that needs to be subjected to data structure identification might relate to multiple fields of business, so to ensure that the trained classification model is able to accurately predict the entity attributes to which the attribute values in the user data belong, the acquired training data should cover all of the fields of business to which the user data relates.

For example, the user data comprises multiple data tables; some of the data tables relate to the field of business "logistics", and some relate to the field of business "apparel processing". Thus, when acquiring the training data, it is necessary to separately acquire training data relating to the field of business "logistics" and training data relating to the field of business "apparel processing".

In some embodiments, in step 14 of determining a mapping relationship between the columns of data in the user data by subjecting the user data to structure identification, specifically, each data table included in the user data may be separately subjected to structural analysis, e.g. a foreign key relationship of each data table may be analysed separately, to determine a mapping relationship between the columns of data in each data table.

For example, data table 1 and data table 2 are two data tables included in the user data; by subjecting data table 1 and data table 2 to structural analysis, it is determined that there is a foreign key relationship between a $1^{st}$ column of data in data table 1 and a $2^{nd}$ column of data in data table 2, so it is determined that there is a mapping relationship between the $1^{st}$ column of data in data table 1 and the $2^{nd}$ column of data in data table 2.

It must be explained that in the process of generating the knowledge graph according to the user data, it is necessary to perform attribute prediction and relationship mapping for each column of data in the user data, so the user data needs to be structured data comprising structural data description information, i.e. the user data needs to be structured data having rows and columns; for example, the user data may be a data table in a relational database. Furthermore, the user data may be one data table generated by one sub-system, or multiple data tables generated by multiple different sub-systems.

It must also be explained that "column of data" as referred to in the above and subsequent embodiments means data located in the same column in the data table; each row of a "column of data" is an attribute value, a "column of data" corresponds to a data field in the corresponding data table, and the attribute values belonging to the same "column of data" are values of the corresponding data field in the data table. The name of the data field in the data table is thus the column name, and since the name of the data field might not be standard, a developer cannot directly determine the content (entity attributes) described by each value under a data field according to the name of the data field; thus, it is necessary to determine the entity attributes described by each "column of data" by means of the classification model. Furthermore, different "columns of data" may be two columns of data in different data tables included in the user data, or may be two different columns of data in one data table included in the user data.

In some embodiments, based on the method 10 for constructing a knowledge graph as shown in FIG. 1, in step 12 of using the training data to train a classification model, a model training file recording the correspondences between the attribute values and the entity attributes may be obtained according to the training data, and the classification model may then be trained according to the obtained model training file.

Figure 2:
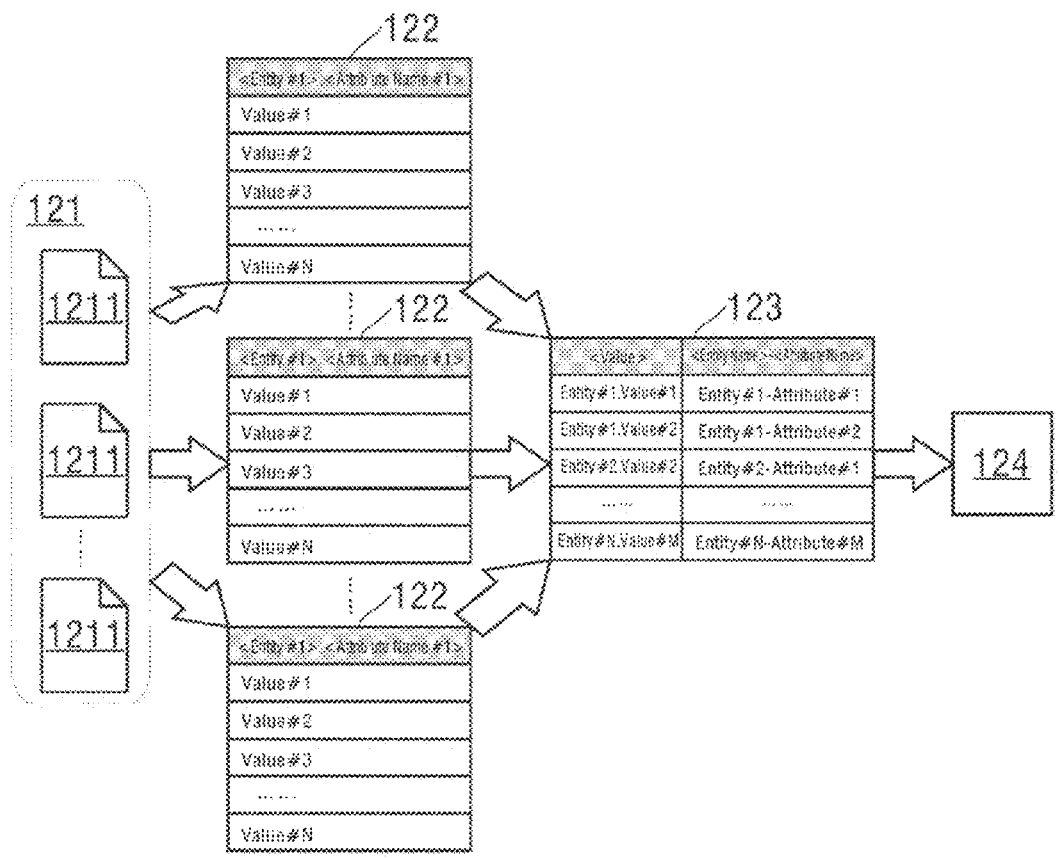
FIG. 2 is a schematic diagram of a classification model training process incorporating teachings of the present disclosure.

FIG. 2 shows a schematic diagram of the classification model training process in one embodiment; firstly, at least one corpus file 122 is extracted from training data 121, such that each corpus file 122 corresponds to one entity attribute, and each corpus file 122 has stored therein at least one attribute value belonging to the entity attribute corresponding to the corpus file 122; a model training file 123 is then generated according to each corpus file 122, such that the correspondence between each attribute value stored in each corpus file 122 and the entity attribute to which it belongs is recorded in the model training file 123; and the model training file 123 is then used to train a classification model 124.

In some embodiments, the training data 121 comprises data 1211 of multiple fields; the data 1211 of each field records possible attribute values of one or more entity attributes, and the attribute values recorded by the data 1211 of each field relate to the same field of business as the user data. The corpus file 122 is obtained by extraction from the field data 1211; one or more corpus files 122 may be extracted from the data 1211 of each field.

In the three corpus files 122 shown in FIG. 2, the entity attribute corresponding to a first corpus file 122 is <Entity #1>.<Attribute Name #1> (characterization for describing the entity with name Entity #1 and the entity attribute with name Attribute Name #1), and each attribute value recorded in the corpus file 122 is a possible value of the entity attribute <Entity #1>.<Attribute Name #1>. The entity attribute corresponding to a second corpus file 122 is <Entity #1>.<Attribute Name #N> (characterization for describing the entity with name Entity #1 and the entity attribute with name Attribute Name #N), and each attribute value recorded in the corpus file 122 is a possible value of the entity attribute <Entity #1>.<Attribute Name #N>. The entity attribute corresponding to a third corpus file 122 is <Entity #N>.<Attribute Name #M> (characterization for describing the entity with name Entity #N and the entity attribute with name Attribute Name #M), and each attribute value recorded in the corpus file 122 is a possible value of the entity attribute <Entity #N>.<Attribute Name #M>.

In some embodiments, multiple possible attribute values of the entity attribute corresponding to each corpus file 122 are recorded therein; by integrating the entity attributes corresponding to and the attribute values recorded in all of the corpus files 122, it is possible to obtain the model training file 123 recording the correspondences between the entity attributes and the attribute values included in the corpus files 122, and the classification model 124 can then be trained according to the correspondences between the entity attributes and the attribute values recorded in the model training file 123, such that the classification model 124 is able to predict the entity attribute to which an inputted attribute value belongs.

In the model training file 123 shown in FIG. 2, the column of the data field <Value> is used to record the attribute values in the corpus files 122, and the column of the data field <Entity Name>.<Attribute Name> is used to record the entity attribute to which the attribute value recorded in the data field <Value> and located in the same row belongs. For example, the entity attribute to which the attribute value Entity #1.Value #1 (characterization for describing the attribute value Value #1 of the entity Entity #1) belongs is Entity #1-Attribute #1 (characterization for describing the entity attribute Attribute #1 of the entity Entity #1), and the entity attribute to which the attribute value Entity #N.Value #M (characterization for describing the attribute value Value #M of the entity Entity #N) belongs is Entity #N-Attribute #M (characterization for describing the entity attribute Attribute #M of the entity Entity #N).

In some embodiments, corpus files corresponding to different entity attributes are extracted from the training data, then the attribute values recorded in the corpus files are integrated according to the entity attributes corresponding to the corpus files, to obtain a model training file recording the correspondences between the attribute values and the entity attributes to which they belong, then the classification model can be trained according to the correspondences recorded in the model training file, such that the trained classification model is able to predict the entity attribute to which an inputted attribute value belongs, ensuring the accuracy with which the trained classification model predicts the entity attribute.

In some embodiments, based on the method 10 for constructing a knowledge graph as shown in FIG. 1, after step 13 of sequentially inputting each attribute value included in one column of data into the classification model to obtain the entity attribute to which each attribute value included in the column of data belongs, the entity attribute described by the column of data may be determined according to the number of attribute values corresponding to each entity attribute. Specifically, for each of the entity attributes to which the attribute values in one column of data belong, the number of attribute values belonging to this entity attribute are counted among the attribute values included in the column of data, then the entity attribute with the greatest number of corresponding attribute values is determined as being a target entity attribute, and the determined target entity attribute is then determined as being the entity attribute described by the column of data.

For example, one column of data in the user data comprises 100 attribute values, amongst which, based on entity attribute prediction by the classification model, 20 attribute values belong to the entity attribute Factory-Type No, 10 attribute values belong to the entity attribute ProductLine-Model_No, and the remaining 70 attribute values belong to the entity attribute Generator.Engine_Model; as the greatest number of attribute values correspond to the entity attribute Generator.Engine_Model, the entity attribute described by the column of data is determined as being Generator.Engine_Model.

In some embodiments, after determining the entity attributes to which the attribute values in one column of data belong, the entity attribute with the greatest number of corresponding attribute values in the column of data is determined as being the target entity attribute of the column of data, then the target entity attribute corresponding to the column of data is determined as being the entity attribute described by the column of data. The entity attribute corresponding to the greatest number of attribute values is determined as being the entity attribute described by the column data by counting, ensuring that the entity attributes described by the columns of data in the user data can be accurately determined. This can not only ensure the accuracy of the subsequently generated knowledge graph, but can also ensure that a developer is able to accurately cite each column of data in the user data when developing an application program.

In some embodiments, after determining the entity attribute described by each column of data in the user data, an attribute mapping table can be generated, to record the entity attribute described by each column of data in the user data by means of the attribute mapping table. For example, Table 1 below shows an attribute mapping table in one embodiment.

TABLE 1

| <Table Name>. Column Name> | <Entity Name>-<Attribute Name> |
|---|---|
| T_Engine.column1 | Generator-Engine_Model |
| T_Engine.column2 | Generator-Manufacture |
| T_Department.column1 | Generator-Name |
| T_Department.column2 | Department-Name |
| ... | ... |

In Table 1 above, the data field <Table Name>.<Column Name> is used to record column names in user data, and the data field <Entity Name>-<Attribute Name> is used to record entity attributes. For example, the user data includes a data table with the table name Engine; the column name of the first column of data in this data table is defined as T_Engine.column1, and the column name of the second column of data in this data table is defined as T_Engine.column2. The column of data with the column name T_Engine.column1 is used to describe an entity attribute whose name is defined as Generator-Engine_Model (the Generator-Engine_Model characterization being used to describe an entity attribute Engine_Model of an entity Generator), and the column of data with the column name T_Engine.column2 is used to describe an entity attribute whose name is defined as Generator-Manufacture (the Generator-Manufacture characterization being used to describe an entity attribute Manufacture of the entity Generator).

In some embodiments, based on the method 10 for constructing a knowledge graph as shown in FIG. 1, after step 13 of determining the entity attribute described by each column of data in the user data, an entity mapping table may be generated, to reflect mapping relationships between entities and entity attributes by means of the entity mapping table. In some embodiments, the entity mapping table may be generated according to the entity attribute described by each column of data in the user data and the entity corresponding to each entity attribute, wherein mapping relationships linking entities, entity attributes, data table names and column names are recorded in the entity mapping table; the data table names are the table names of data tables included in the user data, the column names are the names of corresponding columns in the data tables, a mapping between an entity and an entity attribute means that the entity attribute is used to express the entity, and a mapping linking an entity attribute, a data table name and a column name means that the column of data whose name is this column name in the data table whose table name is this data table name in the user data is the attribute values of this entity attribute.

In some embodiments, entities described by entity attributes can be determined according to the names of the entity attributes, i.e. mapping relationships between entity attributes and entities can be determined, then according to the entity attributes described by the columns of data in the user data, the columns of data in the user data can be distinguished by means of the data table names and column names, and mapping relationships linking entities, entity attributes, data table names and column names can thereby be determined, generating an entity mapping table to record the determined mapping relationships linking all of the entities, entity attributes, data table names and column names. The generated entity mapping relationships can not only serve as a reference for determining mapping relationships between entities in a subsequent step; it is also possible to determine which entity attributes each entity is described by according to the entity mapping table, and which column of which data table an attribute value describing an entity attribute is stored in, to enable a developer to conveniently call the required column data according to the entity mapping relationships when performing development work.

Following on from the above embodiment which gave the attribute mapping table shown in Table 1, Table 2 below shows an entity mapping table in one embodiment.

TABLE 2

| <Entity Name> | <Attribute Name> | <Table Name> | <Attribute Name> |
|---|---|---|---|
| Generator | Engine_Model | T_Engine | column1 |
| Generator | Manufacture | T_Engine | column2 |
| Generator | Name | T_Department | column1 |
| Department | Name | T_Department | column2 |
| ... | ... | ... | ... |

In Table 2 above, the data field <Entity Name> is used to record the names of entities, the data field <Attribute Name> is used to record the names of entity attributes, the data field <Table Name> is used to record the names of data tables, and the data field <Attribute Name> is used to record column names. For example, the column data with the column name column1 in the table T_Engine is attribute values of the entity attribute Engine_Model, the entity attribute Engine_Model being used to describe the entity Generator, and the column data with the column name column2 in the table T_Department is attribute values of the entity attribute T_Department, the entity attribute T_Department being used to describe the entity Department.

In some embodiments, based on the method 10 for constructing a knowledge graph as shown in FIG. 1, in step 15, when determining a mapping relationship between the entity attributes described by the columns of data in the user data, based on the mapping relationship between the columns of data in the user data and the mapping relationships between column data and entity attributes, if there is a mapping relationship between column data A used to describe entity attribute A and column data B used to describe entity attribute B, then it is determined that there is a mapping relationship between entity attribute A and entity attribute B. Thus, based on the mapping relationship between the columns of data and the entity attributes described by the column data, a mapping relationship between the entity attributes can be accurately determined, thereby ensuring the accuracy of the mapping relationship between entity attributes determined according to the mapping relationship between entity attributes.

In some embodiments, after determining mapping relationships between entity attributes, if entity attribute A is used to describe entity A, and entity attribute B is used to describe entity B, then when there is a mapping relationship between entity attribute A and entity attribute B, it is determined that there is a mapping relationship between entity A and entity B, i.e. there is an associative relationship between entity A and entity B.

For example, by analysing the data structure of the user data, it is determined that there is a relationship between the column data table #1 (Col #1) (characterizing the column data with column name Col #1 in the data table table #1) and column data table #2 (Col #1) (characterizing the column data with column name Col #1 in the data table table #2); the entity attribute described by the column data table #1 (Col #1) is used to describe the entity Entity #1, and the entity attribute described by the column data table #2 (Col #1) is used to describe the entity Entity #2, so it is determined that there is a mapping relationship between the entity Entity #1 and the entity Entity #2.

In some embodiments, based on the method 10 for constructing a knowledge graph as provided in the embodiments above, after step 15 of determining mapping relationships between the entity attributes described by the columns of data in the user data, a relationship mapping table may be generated according to the mapping relationships between the entity attributes and the entity attributes described by the columns of data in the user data, wherein the mapping relationships between the entity attributes, and the mapping relationship linking the entity attributes to the table names of the data tables and the column names of the columns containing the column data describing the entity attributes in the user data, are recorded in the relationship mapping table.

In some embodiments, a relationship mapping table is generated for recording the mapping relationships between entity attributes and the mapping relationships between column data and entity attributes; by means of the relationship mapping table, it is possible to conveniently determine which entity attributes have a mapping relationship therebetween, and it is possible to determine which column of which data table the attribute values of two entity attributes with a mapping therebetween are respectively stored in, so a developer can conveniently look up which entity attributes have a mapping relationship with an entity attribute according to the relationship mapping table, and can conveniently determine which column of which data table the attribute value of each entity attribute is stored in, so the developer can call user data more conveniently when performing development work.

For example, Table 3 below shows a relationship mapping table in one example.

TABLE 3

| <From Entity>.<Attribute Name> | <From_Table>.<Column> | <To_Entity>.<Attribute Name> | <To_Table>.<Column> |
|---|---|---|---|
| Generator.Manufacture | T_Engine.column2 | Department.Name | T_Department.column2 |
| ... | ... | ... | ... |

In Table 3 above, the data field <From Entity>.<Attribute Name> and the data field <To Entity>.<Attribute Name> are respectively used to record two entity attributes with a mapping relationship therebetween; the data field <From_Table>.<Column> is used to record the storage position (including data table name and column name), in the user data, of an attribute value of a corresponding entity attribute under the data field <From Entity>.<Attribute Name>, and the data field <To_Table>.<Column> is used to record the storage position (including data table name and column name), in the user data, of an attribute value of a corresponding entity attribute under the data field <To Entity>.<Attribute Name>. For example, there is a mapping relationship between the entity attribute Generator.Manufacture and the entity attribute Department.Name; the storage position of the entity attribute Generator.Manufacture in the user data is T_Engine.column2 (characterizing the column with column name column2 in the data table T_Engine), and the storage position of the entity attribute Department.Name in the user data is T_Department.column2 (characterizing the column with column name column2 in the data table T_Department).

It must be explained that based on the embodiments above, the name of an entity attribute includes the name of the entity described by the entity attribute, so the entity described by the entity attribute can be determined directly according to the name of the entity attribute. Furthermore, the column name includes the table name of the data table containing the corresponding column data, so the data table containing the column data described by the column name can be determined directly according to the column name.

Figure 3:
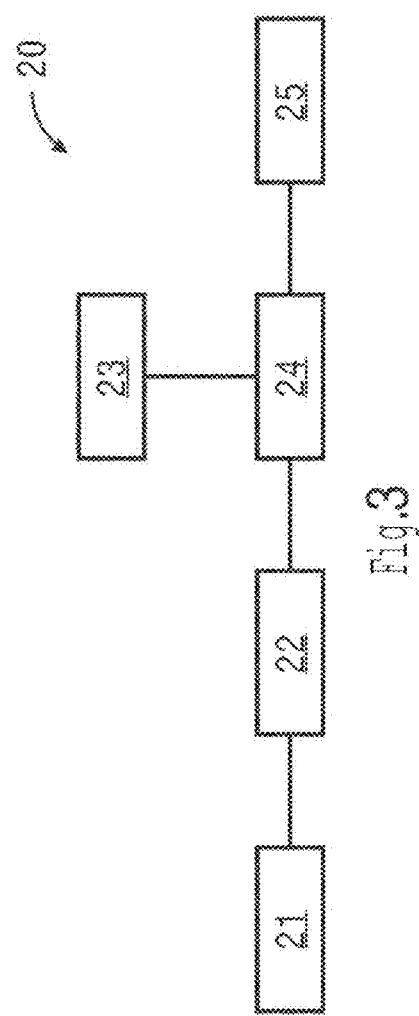
FIG. 3 is a schematic diagram of an apparatus for constructing a knowledge graph incorporating teachings of the present disclosure.

As shown in FIG. 3, one example embodiment of the present disclosure provides an apparatus 20 for constructing a knowledge graph, comprising: a model training module 21, configured to acquire training data relating to the same field as user data, and use the training data to train a classification model, wherein the user data is data to be subjected to data structure identification, and the classification model is used to output, based on an inputted attribute value, an entity attribute to which the attribute value belongs; an attribute classification module 22, configured to, for each column of data in the user data, respectively input each attribute value included in the column of data into the classification model trained by the model training module 21, to obtain an entity attribute to which each attribute value in the column of data belongs, and determine an entity attribute described by the column of data according to the entity attribute to which each attribute value in the column of data belongs; a structure analysis module 23, configured to subject the user data to data structure identification, to determine a mapping relationship between the columns of data in the user data; a relationship mapping module 24, configured to determine a mapping relationship between the entity attributes described by the columns of data in the user data according to the entity attributes described by the columns of data in the user data as determined by the attribute classification module 22 and the mapping relationship between the columns of data in the user data as determined by the structure analysis module 23, and determine a mapping relationship between entities corresponding to the entity attributes described by the columns of data in the user data according to the mapping relationship between the entity attributes described by the columns of data in the user data and the entities corresponding to the entity attributes; and a graph construction module 25, configured to generate a knowledge graph comprising the entities and the mapping relationship between the entities according to the mapping relationship between the entities as determined by the relationship mapping module 24.

In some embodiments, the model training module 21 may be used to perform step 11 and step 12 in the method embodiments above, the attribute classification module 22 may be used to perform step 13 in the method embodiments above, the structure analysis module 23 may be used to perform step 14 in the method embodiments above, the relationship mapping module 24 may be used to perform step 15 and step 16 in the method embodiments above, and the graph construction module 25 may be used to perform step 17 in the method embodiments above.

Figure 4:
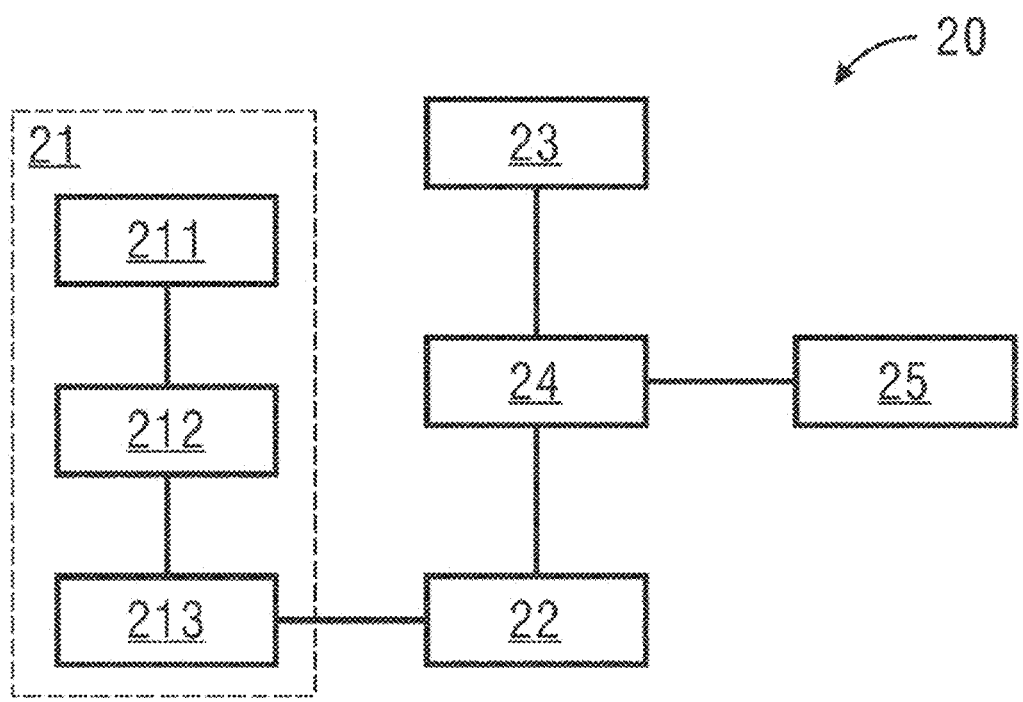
FIG. 4 is a schematic diagram of another apparatus for constructing a knowledge graph incorporating teachings of the present disclosure.

In some embodiments, based on the apparatus 20 for constructing a knowledge graph shown in FIG. 3, as shown in FIG. 4 the model training module 21 comprises: an extraction sub-module 211, configured to extract at least one corpus file from the training data, wherein each corpus file corresponds to one entity attribute, and each corpus file has stored therein at least one attribute value belonging to the entity attribute corresponding to the corpus file; an integration sub-module 212, configured to generate a model training file according to each corpus file extracted by the extraction sub-module 211, wherein the correspondence between each attribute value stored in each corpus file and the entity attribute to which it belongs is recorded in the model training file; a training sub-module 213, configured to use the model training file generated by the integration sub-module 212 to train the classification model.

Figure 5:
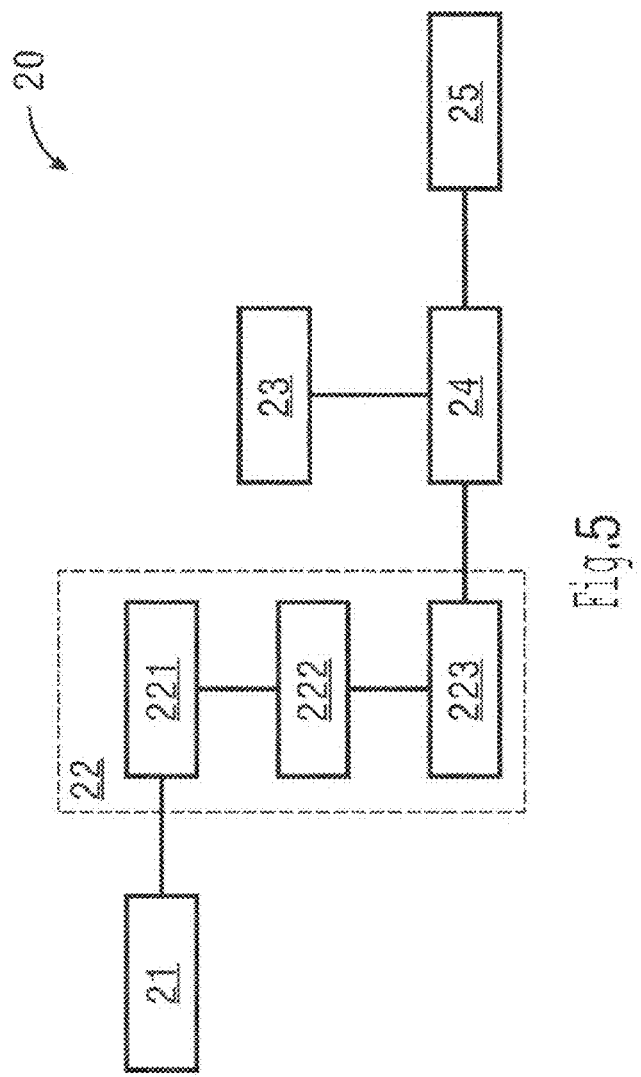
FIG. 5 is a schematic diagram of another apparatus for constructing a knowledge graph incorporating teachings of the present disclosure.

In some embodiments, based on the apparatus 20 for constructing a knowledge graph shown in FIG. 3, as shown in FIG. 5 the attribute classification module 22 comprises: a counting sub-module 221, configured to, for each of the entity attributes to which the attribute values in one column of data belong, count the number of attribute values belonging to this entity attribute among the attribute values included in the column of data; a screening sub-module 222, configured to determine a target entity attribute according to a counting result of the counting sub-module 221, wherein the number of attribute values belonging to the target entity attribute is greatest among the attribute values included in one column of data; and an output sub-module 223, configured to determine the target entity attribute screened out by the screening sub-module 222 to be the entity attribute described by the corresponding column data.

Figure 6:
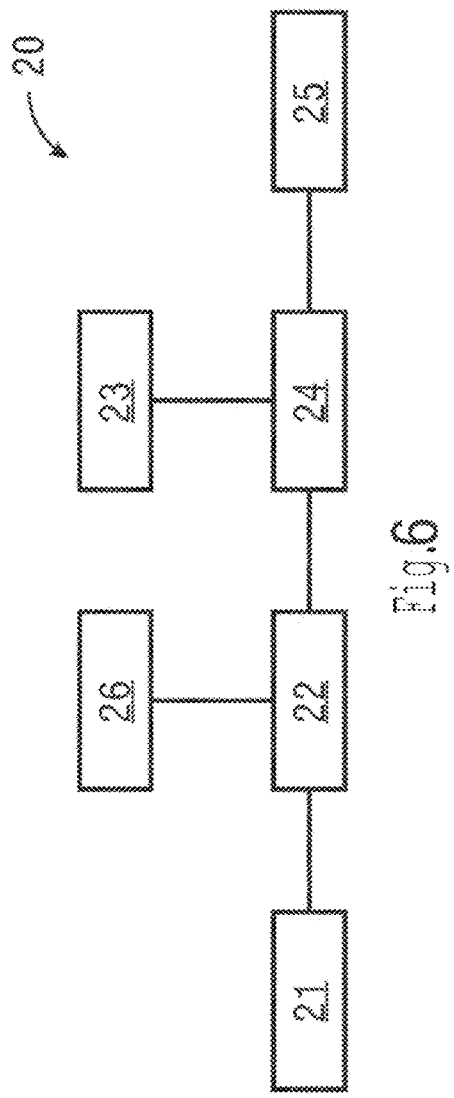
FIG. 6 is a schematic diagram of an apparatus for constructing a knowledge graph comprising a first table generating module incorporating teachings of the present disclosure.

In some embodiments, based on the apparatus 20 for constructing a knowledge graph shown in FIG. 3, as shown in FIG. 6 the apparatus 20 for constructing a knowledge graph further comprises: a first table generating module 26, configured to generate an entity mapping table according to the entity corresponding to each entity attribute and the entity attribute described by each column of data in the user data as determined by the attribute classification module 22, wherein a mapping relationship linking an entity, an entity attribute, a data table name and a column name is recorded in the entity mapping table; the data table name is a table name of a data table included in the user data, the column name is a name of a corresponding column in the data table, a mapping between an entity and an entity attribute means that the entity attribute is used to describe the entity, and a mapping linking an entity attribute, a data table name and a column name means that a column of data whose name is this column name in the data table whose table name is this data table name in the user data is the attribute value of this entity attribute.

Figure 7:
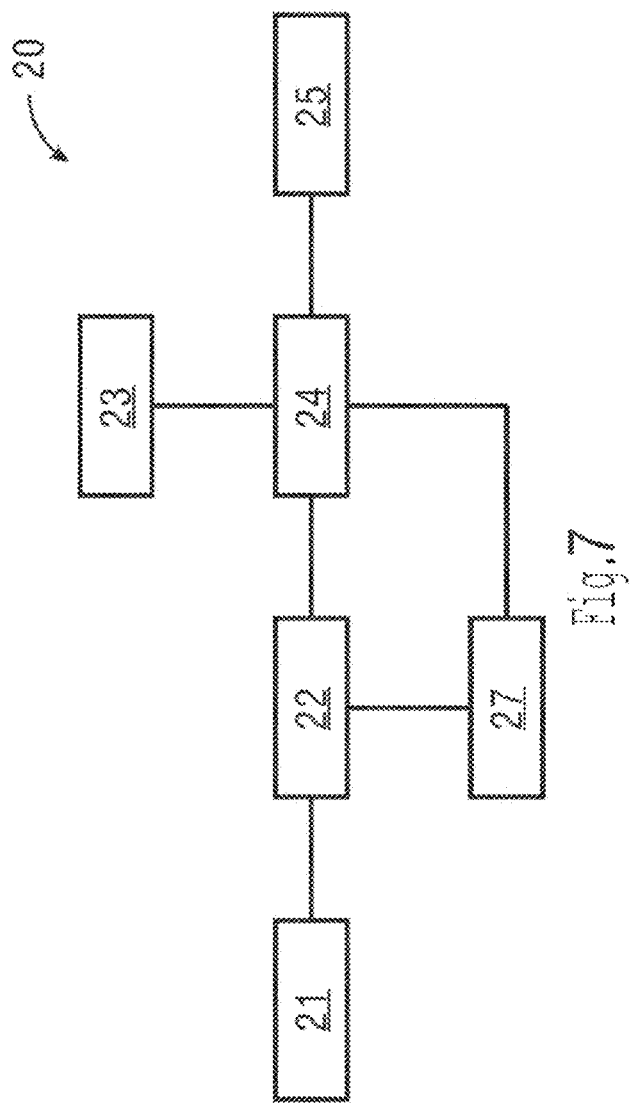
FIG. 7 is a schematic diagram of an apparatus for constructing a knowledge graph comprising a second table generating module incorporating teachings of the present disclosure.

In some embodiments, based on the apparatus 20 for constructing a knowledge graph as provided in the above embodiments, as shown in FIG. 7 the apparatus 20 for constructing a knowledge graph further comprises a second table generating module 27, configured to generate a relationship mapping table according to the entity attributes described by the columns of data in the user data as determined by the attribute classification module 22 and the mapping relationship between the entity attributes described by the columns of data in the user data as determined by the relationship mapping module 24, wherein the mapping relationship between the entity attributes, and a mapping relationship linking the entity attributes to table names of data tables and column names of columns containing the column data describing the entity attributes in the user data, are recorded in the relationship mapping table.

It must be explained that in the apparatus embodiments above, interactions between the modules are based on the same concepts as the method embodiments above; for specific details, see the descriptions in the method embodiments above, which are not repeated here. As shown in FIG. 8, one example embodiment of the present disclosure provides another apparatus 30 for constructing a knowledge graph, comprising: at least one memory 31 and at least one processor 32; the at least one memory 31 is used to store a machine-readable program; and the at least one processor 32 is used to call the machine-readable program, to perform the method for constructing a knowledge graph as provided in the embodiments above.

In some embodiments, a computer-readable medium stores instructions for causing a machine to perform the method for constructing a knowledge graph as described herein. In some embodiments, a system or apparatus equipped with a storage medium storing thereon software program code realizing the functions of any of the above embodiments, and a computer (or CPU or MPU) of the system or apparatus is caused to read and execute the program code stored in the storage medium. In this case, the program code read from the storage medium can itself realize the functions of any of the above embodiments, so the program code and the storage medium storing the program code form part of the teachings.

Embodiments of storage media used to provide program code include floppy disks, hard disks, magneto-optical disks, optical disks (e.g. CD-ROM, CD-R, CD-RW, DVD-ROM, DVD-RAM, DVD-RW, DVD+RW), magnetic tape, non-volatile memory cards and ROM. In some embodiments, program code may be downloaded from a server computer over a communication network. Furthermore, it should be clear that an operating system operating on a computer, etc. can be made to complete some or all of the actual operations, not only through execution of program code read by a computer, but also by means of instructions based on program code, so as to realize the functions of any of the embodiments above.

In some embodiments, program code read out from the storage medium is written into a memory installed in an expansion board inserted in the computer, or written into a memory installed in an expansion module connected to the computer, and thereafter instructions based on the program code make a CPU etc. installed on the expansion board or expansion module execute some or all of the actual operations, so as to realize the functions of any of the embodiments above.

In some embodiments, there is a computer program, comprising computer-executable instructions which, when executed, cause at least one processor to perform one or more of the methods for constructing a knowledge graph as described herein.

In some embodiments, there is a computer program product, tangibly stored on a computer-readable medium and comprising computer-executable instructions which, when executed, cause at least one processor to perform one or more of the methods for constructing a knowledge graph as described herein.

Not all of the steps and modules in the procedures and system structure diagrams above are necessary; certain steps or modules may be omitted according to actual requirements. The order in which steps are executed is not fixed, and may be adjusted as required. The system structures described in the embodiments above may be physical structures or logic structures, i.e. some modules might be realized by the same physical entity, or some modules might be realized by multiple physical entities, or realized jointly by components in multiple independent devices.

In the embodiments above, hardware modules may be realized mechanically or electrically. For example, a hardware module may comprise a permanent dedicated circuit or logic (e.g. a special processor, FPGA or ASIC) to complete a corresponding operation. A hardware unit may also comprise programmable logic or circuitry (e.g. a universal processor or other programmable processor), and may be set temporarily by software to complete a corresponding operation. Particular embodiments (mechanical, or dedicated permanent circuitry, or temporarily set circuitry) may be determined based on cost and time considerations.

The teachings of the present disclosure have been displayed and explained in detail above by means of the drawings and example embodiments, but the scope of the present disclosure is not limited to these disclosed embodiments. Based on the embodiments described above, those skilled in the art will know that further embodiments, also falling within the scope of protection of the present disclosure, could be obtained by combining code checking means in different embodiments above.

What is claimed is:

1. A method for constructing an application based on a knowledge graph representing data structures, the method comprising:
   acquiring training data relating to a field as user data in different subsystems of an industrial system, wherein the user data is data to be subjected to data structure identification;
   using the training data to train a classification model generating, based on an attribute value, an entity attribute to which the attribute value belongs;
   for each column of data in the user data, respectively providing each attribute value included in the column of data into the classification model, to obtain an entity attribute to which each attribute value in the column of data belongs, and determining an entity attribute described by the column of data according to the entity attribute to which each attribute value in the column of data belongs;
   subjecting the user data to data structure identification to determine a mapping relationship between the columns of data in the user data;
   determining a mapping relationship between the entity attributes described by the columns of data in the user data according to the entity attributes described by the columns of data in the user data and the mapping relationship between the columns of data in the user data;
   determining a mapping relationship between entities corresponding to the entity attributes described by the columns of data in the user data according to the mapping relationship between the entity attributes described by the columns of data in the user data and the entities corresponding to the entity attributes;
   generating a knowledge graph comprising the entities and the mapping relationship between the entities;
   generating a relationship mapping table according to the entity attributes described by columns of data in the user data as determined and the mapping relationship between the entity attributes described by the columns of data in the user data as determined; and
   displaying the knowledge graph during development of the application to indicate which attribute values have a mapping relationship with an entity attribute.

2. The method as claimed in claim 1, wherein using the training data to train a classification model comprises:
   extracting a corpus file from the training data, wherein each corpus file corresponds to one entity attribute, and each corpus file has stored therein at least one attribute value belonging to the entity attribute corresponding to the corpus file;
   generating a model training file according to each corpus file, wherein the correspondence between each attribute value stored in each corpus file and the entity attribute to which it belongs is recorded in the model training file; and
   using the model training file to train the classification model.

3. The method as claimed in claim 1, wherein determining an entity attribute described by the column of data according to the entity attribute to which each attribute value in the column of data belongs comprises:
   for each of the entity attributes to which the attribute values in the column of data belong, counting the number of attribute values belonging to this entity attribute among the attribute values included in the column of data;
   determining a target entity attribute, wherein the number of attribute values belonging to the target entity attribute is greatest among the attribute values included in the column of data; and
   determining the target entity attribute to be the entity attribute described by the column of data.

4. The method as claimed in claim 1, wherein, after determining an entity attribute described by the column of data according to the entity attribute to which each attribute value in the column of data belongs, the method further comprises:
   generating an entity mapping table according to the entity attribute described by each column of data in the user data and the entity corresponding to each entity attribute; and
   recording a mapping relationship linking an entity, an entity attribute, a data table name and a column name in the entity mapping table;
   wherein the data table name includes a table name of a data table included in the user data;
   the column name includes a name of a corresponding column in the data table;
   a mapping between an entity and an entity attribute indicates the entity attribute is used to describe the entity; and
   a mapping linking an entity attribute, a data table name and a column name indicates a column of data whose name is this column name in the data table whose table name is this data table name in the user data is the attribute value of this entity attribute.

5. The method as claimed in claim 1, further comprising, after determining a mapping relationship between the entity attributes described by the columns of data in the user data, the method further comprises generating a relationship mapping table according to the entity attributes described by the columns of data in the user data and the mapping relationship between the entity attributes described by the columns of data in the user data, wherein the mapping relationship between the entity attributes, and a mapping relationship linking an entity attribute to a table name of a data table and a column name of a column containing the column data describing this entity attribute in the user data, are recorded in the relationship mapping table.

6. An apparatus for developing an application based on a knowledge graph, the apparatus comprising:
one or more processors in communication with a memory; and
the memory storing a set of instructions;
wherein the set of instructions, when accessed and executed by the one or more processors, cause the one or more processors:
to acquire training data relating to the same field as user data in different subsystems of an industrial system, and use the training data to train a classification model, wherein the user data is data to be subjected to data structure identification, and the classification model generates, based on an inputted attribute value, an entity attribute to which the attribute value belongs;
for each column of data in the user data, respectively input each attribute value included in the column of data into the classification model trained by the model training module to obtain an entity attribute to which each attribute value in the column of data belongs, and determine an entity attribute described by the column of data according to the entity attribute to which each attribute value in the column of data belongs;
to subject the user data to data structure identification, to determine a mapping relationship between the columns of data in the user data;
to determine a mapping relationship between the entity attributes described by the columns of data in the user data according to the entity attributes described by the columns of data in the user data as determined by the attribute classification module and the mapping relationship between the columns of data in the user data as determined by the structure analysis module, and determine a mapping relationship between entities corresponding to the entity attributes described by the columns of data in the user data according to the mapping relationship between the entity attributes described by the columns of data in the user data and the entities corresponding to the entity attributes;
to generate a knowledge graph comprising the entities and the mapping relationship between the entities according to the mapping relationship between the entities as determined by the relationship mapping module;
to generate a relationship mapping table according to the entity attributes described by columns of data in the user data as determined and the mapping relationship between the entity attributes described by the columns of data in the user data as determined; and
displaying the knowledge graph during development of the application to indicate which attribute values have a mapping relationship with an entity attribute.

7. The apparatus as claimed in claim 6, wherein the model training module comprises:
an extraction sub-module configured to extract at least one corpus file from the training data, wherein each corpus file corresponds to one entity attribute, and each corpus file has stored therein at least one attribute value belonging to the entity attribute corresponding to the corpus file;
an integration sub-module configured to generate a model training file according to each corpus file extracted by the extraction sub-module wherein the correspondence between each attribute value stored in each corpus file and the entity attribute to which it belongs is recorded in the model training file; and
a training sub-module configured to use the model training file generated by the integration sub-module to train the classification model.

8. The apparatus as claimed in claim 6, wherein the attribute classification module comprises:
a counting sub-module configured to, for each of the entity attributes to which the attribute values in one column of data belong, count the number of attribute values belonging to this entity attribute among the attribute values included in the column of data;
a screening sub-module configured to determine a target entity attribute according to a counting result of the counting sub-module, wherein the number of attribute values belonging to the target entity attribute is greatest among the attribute values included in one column of data;
an output sub-module, configured to determine the target entity attribute screened out by the screening sub-module to be the entity attribute described by the corresponding column data.

9. The apparatus as claimed in claim 6, further comprising:
a first table generating module configured to generate an entity mapping table according to the entity corresponding to each entity attribute and the entity attribute described by each column of data in the user data as determined by the attribute classification module, wherein a mapping relationship linking an entity, an entity attribute, a data table name and a column name is recorded in the entity mapping table;
wherein the data table name is a table name of a data table included in the user data, the column name is a name of a corresponding column in the data table, a mapping between an entity and an entity attribute means that the entity attribute is used to describe the entity, and a mapping linking an entity attribute, a data table name and a column name means that a column of data whose name is this column name in the data table whose table name is this data table name in the user data is the attribute value of this entity attribute.

10. The apparatus as claimed in claim 6, further comprising:
a second table generating module configured to generate a relationship mapping table according to the entity attributes described by the columns of data in the user data as determined by the attribute classification module and the mapping relationship between the entity attributes described by the columns of data in the user data as determined by the relationship mapping module;
wherein the mapping relationship between the entity attributes, and a mapping relationship linking an entity attribute to a table name of a data table and a column name of a column containing the column data describing this entity attribute in the user data, are recorded in the relationship mapping table.

* * * * *